(12) United States Patent
Kanke et al.

(10) Patent No.: US 9,689,774 B2
(45) Date of Patent: Jun. 27, 2017

(54) TORQUE COMMAND GENERATION DEVICE

(71) Applicant: Meidensha Corporation, Tokyo (JP)

(72) Inventors: Masayasu Kanke, Tokyo (JP); Masami Nishihara, Tokyo (JP); Kenji Kawakubo, Tokyo (JP); Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 14/787,238

(22) PCT Filed: Apr. 21, 2014

(86) PCT No.: PCT/JP2014/061138
§ 371 (c)(1),
(2) Date: Oct. 26, 2015

(87) PCT Pub. No.: WO2014/175203
PCT Pub. Date: Oct. 30, 2014

(65) Prior Publication Data
US 2016/0109328 A1 Apr. 21, 2016

(30) Foreign Application Priority Data
Apr. 26, 2013 (JP) ................................. 2013-094622

(51) Int. Cl.
*G01M 17/00* (2006.01)
*G01M 13/02* (2006.01)
(Continued)

(52) U.S. Cl.
CPC ........... *G01M 13/025* (2013.01); *B60L 11/02* (2013.01); *G01M 15/044* (2013.01);
(Continued)

(58) Field of Classification Search
USPC .............................. 73/116.01, 116.02, 116.05
See application file for complete search history.

(56) References Cited

U.S. PATENT DOCUMENTS 5,323,644 A * 6/1994 Schaefer ............... G01M 17/06
73/116.06
9,116,062 B2 * 8/2015 Akiyama ............ G01M 13/025
(Continued)

FOREIGN PATENT DOCUMENTS

JP H 8-083127 3/1996
JP H 8-137555 5/1996
(Continued)

Primary Examiner — Eric S McCall
(74) Attorney, Agent, or Firm — Muncy, Geissler, Olds & Lowe, P.C.

(57) ABSTRACT

The purpose of the present invention is to provide a torque command generation device for generating a motor-generated-torque command that makes it possible to maximize excitation force while ensuring necessary acceleration, and the like, within a limited motor torque range. A torque command generation device is provided with: a maximum torque calculation unit for calculating, according to a motor speed, a maximum torque value for a motor-generated-torque-command signal value; a DC component limiter for calculating a DC signal value; a surplus amplitude calculation unit for calculating a surplus amplitude by subtracting the maximum torque value from the sum of the DC component value; a sine-wave transmitter for generating a sine wave having an amplitude obtained by subtracting the surplus amplitude from a base amplitude; and a summing unit for calculating the motor-generated-torque-command signal value.

4 Claims, 12 Drawing Sheets

(51) Int. Cl.
*G01M 15/04* (2006.01)
*G01M 17/007* (2006.01)
*H02P 6/08* (2016.01)
*B60L 11/02* (2006.01)
*H02P 31/00* (2006.01)

(52) U.S. Cl.
CPC ........... *G01M 17/0074* (2013.01); *H02P 6/08* (2013.01); *H02P 31/00* (2013.01)

(56) References Cited

U.S. PATENT DOCUMENTS

| | | | | |
|---|---|---|---|---|
| 2013/0283900 | A1* | 10/2013 | Engstrom | G01M 17/0074 73/115.05 |
| 2015/0142341 | A1* | 5/2015 | Akiyama | G01L 3/24 702/41 |
| 2015/0219529 | A1* | 8/2015 | Akiyama | G01M 13/025 73/115.01 |
| 2016/0084735 | A1* | 3/2016 | Akiyama | G01M 15/04 73/116.05 |
| 2016/0139002 | A1* | 5/2016 | Akiyama | G01M 13/025 73/115.01 |

FOREIGN PATENT DOCUMENTS

| | | |
|---|---|---|
| JP | H 9-015100 | 1/1997 |
| JP | 2002-071520 | 3/2002 |
| JP | 2009-287986 | 12/2009 |
| JP | 2013-257234 | 12/2013 |

* cited by examiner

TORQUE COMMAND GENERATION DEVICE

TECHNICAL FIELD

The present invention relates to a torque command generation device. In more detail, it relates to a torque command generation device that is incorporated into a test system for drivetrains causing a torque imitating an engine to be generated with a motor connected to a shaft of the drivetrain of a vehicle, the device generating a motor-generated-torque command signal for driving the motor.

BACKGROUND ART

Drivetrain refers to a general term for the plurality of devices for transmitting the energy generated by an engine to the drive wheels, and is constituted by the engine, clutch, transmission, drive shaft, propeller shaft, differential gears, drive wheels, etc. In the performance evaluation test for drivetrains, the durability performance, quality, etc. thereof are evaluated by actually continuously driving a transmission with an engine. In recent years, as a system that performs such tests of drivetrains, a system has been proposed that generates the drive torque inputted to a work with a motor instead of with an actual engine.

With an actual engine, cyclical torque variation arises due to the combustion process in each cylinder. For this reason, the torque command generation device generates a motor-generated-torque command signal by compositing an AC signal of a predetermined excitation frequency and excitation amplitude and a DC signal for driving at a predetermined acceleration/deceleration, and inputs this to a motor driving device (e.g., inverter) (e.g., refer to Patent Documents 1,2 and 3). The test system for drivetrains thereby performs a test imitating an actual engine.

Patent Document 1: Japanese Unexamined Patent Application, Publication No. 2002-71520
Patent Document 2: Japanese Unexamined Patent Application, Publication No. H8-83127
Patent Document 3: Japanese Unexamined Patent Application, Publication No. 2009-287986

DISCLOSURE OF THE INVENTION

Problems to be Solved by the Invention

However, the motor driving device directly driving the motor operates within a predetermined allowable range considering the heat generation characteristics, mechanical strength, etc. unique to the motor being used actually. This is realized by forcibly discarding a surplus amount exceeding the allowable range from the motor generation command signal, in the case of the value of the motor-generated-torque command signal sent from the torque command generation device being such that exceeds the above-mentioned allowable range, for example. In many of the motor driving devices being used in test systems, such a torque limiting function is implemented in order to protect the devices constituting the motor and system. The adverse effects that can arise from the torque limiting function will be explained in detail by referencing FIG. 13.

FIG. 13 is a graph showing a specific example of a motor-generated-torque command signal inputted from the torque command generation device to a motor driving device. In FIG. 13, the thin solid line indicates the time change of the motor-generated-torque command signal that is generated in the torque command generation device. More specifically, this motor-generated-torque command signal is generated by compositing a DC signal of 500 (Nm) and an AC signal characterized by an excitation amplitude of 1000 (Nm) and an excitation frequency of 10 (Hz). The torque command signal containing this DC component and AC component comes to have a maximum value of 1500 (Nm), a minimum value of −500 (Nm), and an average value of 500 (Nm).

Herein, a case is considered of the motor driving device limiting the generated torque of the motor to between a maximum torque upper limit value defined at 1000 (Nm) and a maximum torque lower limit value defined at −1000 (Nm). In this case, with the motor driving device, the torque command signal indicated by the thin solid line will be limited to a signal such as that shown by the thick dotted line in actual practice, since the surplus amount exceeding the maximum torque upper limit value 1000 (Nm) in the torque command signal is forcibly discarded.

In this case, as shown by the thick one-dot dashed line in FIG. 13, the average generated torque will decline from the original planned 500 (Nm) by the amount discarded according to the maximum torque upper limit value. Therefore, in the case of discarding occurring in the motor driving device, the average torque will shift, and it will no longer be possible to achieve the required acceleration or deceleration (hereinafter referred to as "acceleration, etc."). In addition, since the torque command signal deforms from a sine wave to a strain wave according to the discarding, the excitation force (excitation amplitude) also declines from the intended magnitude.

The present invention has been made taking the above such issues into account, and has an object of providing a torque command generation device of a drivetrain test system that generates a motor-generated-torque command such that the excitation force can be maximized, while ensuring the required acceleration, etc. within a limited range of motor torque.

Means for Solving the Problems

In order to achieve the above-mentioned object, a first aspect of the present invention provides a torque command generation device (e.g., the torque command generation device 6 (FIG. 2), 6B (FIG. 6), 6C (FIG. 10) described later) that generates a motor-generated-torque command signal for driving a motor in a drivetrain test system (e.g., the test system 1 described later) for generating a torque imitating an engine of a vehicle with a motor (e.g., the input-side dynamometer 2 described later) connected to a shaft of a drivetrain (e.g., the test piece W described later) of the vehicle. The torque command generation device includes: a limit value calculation means (e.g., the maximum torque calculation unit 633 (FIG. 2), 665 (FIG. 6), etc. described later) for calculating a limit value for a value of the motor-generated-torque command signal according to a revolution speed of the motor; a DC signal generation means (e.g., the DC component limiter 635 (FIG. 2) and DC component calculation unit 661 (FIG. 6) described later) for generating a DC signal; an AC signal generation means (e.g., the maximum torque calculation unit 633, limit amplitude calculation unit 634, provisional value calculation unit 636, surplus amplitude calculation unit 637, AC component limiter 638 and sine-wave transmitter 639 in FIG. 2; AC component calculation unit 662, multiplying unit 663 and attenuation coefficient calculation unit 666 in FIG. 6; and attenuation coefficient calculation unit 666C in FIG. 10, etc.

described later) for generating an AC signal; and a compositing means (e.g., the summing unit 640 (FIG. 2), 664 (FIG. 6), etc. described later) for compositing the DC signal and the AC signal to generate the motor-generated-torque command signal, in which the AC signal generation means generates the AC signal of an amplitude such that the value of the motor-generated-torque command signal does not exceed the limit value.

According to a second aspect, in this case, it is preferable for the AC signal generation means to include: a surplus amplitude calculation means (e.g., the provisional value calculation unit 636, surplus amplitude calculation unit 637, etc. in FIG. 2 described later) for calculating a surplus amplitude by subtracting the limit value from a sum of a value of the DC signal and a predetermined base amplitude; and a transmission means (e.g., the sine-wave transmitter 639 in FIG. 2 described later) for generating the AC signal of an amplitude obtained by subtracting the surplus amplitude from the base amplitude.

According to a third aspect, in this case, it is preferable for the AC signal generation means to further include a limit amplitude calculation means (e.g., the limit amplitude calculation unit 634 in FIG. 2 described later) for calculating a limit amplitude according to a frequency of the AC signal, and the transmission means to generate the AC signal of the smaller amplitude among the limit amplitude and an amplitude obtained by subtracting the surplus amplitude from the base amplitude.

According to a fourth aspect, in this case, it is preferable for the AC signal generation means to include: a base signal generation means (e.g., the AC component calculation unit 662 in FIG. 6 described later) for generating a base AC signal; a multiplying means (e.g., the multiplying unit 663 in FIG. 6 described later) for generating the AC signal by multiplying a predetermined amplitude attenuation coefficient by a value of the base AC signal; and a surplus amplitude limiting means (e.g., the surplus amplitude controller 671 in FIG. 8 described later) for determining the amplitude attenuation coefficient so that there is no deviation between a maximum value of the motor-generated-torque command signal and the limit value.

According to a fifth aspect, in this case, it is preferable for the AC signal generation means to include: a frequency component detection means (e.g., the frequency component detection unit 672 in FIG. 10 described later) for detecting a frequency component of the motor-generated-torque command signal; a limit amplitude calculation means (e.g., the limit amplitude ratio calculation unit 673 in FIG. 10 described later) for calculating a limit amplitude according to the frequency of the motor-generated-torque command signal; a limit ratio calculation means (e.g., the limit amplitude ratio calculation unit 673 in FIG. 10 described later) for calculating a ratio of amplitude detected by the frequency component detection means relative to the limit amplitude calculated by the limit amplitude calculation means for each of a plurality of different frequencies; and a limit amplitude limiting means (e.g., the limit amplitude controller 675 in FIG. 10 described later) for determining the amplitude attenuation coefficient so that the largest ratio among a plurality of ratios calculated by the limit ratio calculation means becomes a predetermined target value.

In order to achieve the above-mentioned object, a sixth aspect of the present invention provides a torque command generation device (e.g., the torque command generation device 6A in FIG. 4 described later) that generates a motor-generated-torque command signal for driving a motor in a drivetrain test system for generating a torque imitating an engine of a vehicle with a motor connected to a shaft of a drivetrain of the vehicle. The torque command generation device includes: a base value calculation means (e.g., the base value calculation unit 653 in FIG. 4 described later) for calculating positive and negative torque limit base values (UpperLim_bs, LowerLim_bs) for the motor-generated-torque command signal according to a revolution speed of the motor; a correction means (e.g., the correction calculation unit 654 in FIG. 4 described later) for correcting the positive and negative torque limit base values and calculating positive and negative torque limit values (UpperLim, LowerLim); and a torque command generating means (e.g., the torque limiter 655 in FIG. 4 described later) for generating the motor generated torque command signal (Tdr_o) by discarding larger values than the positive torque limit value and smaller values than the negative torque limit value from a base signal (Tdr_i) including a DC component and AC component, in which the correction means, in a case of a surplus occurring in the base signal relative to either one sign of the positive and negative torque limit base values, corrects to the torque limit base value of the opposite sign to a smaller absolute value.

According to a seventh aspect, in this case, it is preferable, in a case of a surplus occurring in the base signal (Tdr_i) relative to either one sign of the positive and negative torque limit base values, for the correction means to correct the torque limit base value of the opposite sign by adding a value (L_cor, U_cor) obtained by subtracting the torque limit base value of one sign from the sum of a value of a DC component of the base signal and an extreme value of the base signal on a side of the one sign, to the torque limit base value of the opposite sign.

Effects of the Invention

The first aspect of the present invention generates a motor-generated-torque command signal by compositing a DC signal and an AC signal. In particular, the present invention calculates a limit value for the value of this motor-generated-torque command signal according to the revolution speed of the motor, and generates an AC signal of an amplitude such that the value of the motor-generated-torque command signal does not exceed this limit value. By generating a motor-generated-torque command signal such that does not exceed the limit value in the torque command generation device in this way, it is possible to prevent being forcibly discarded in an unintended state in the motor driving device subsequently, and the average torque deviating from the intended magnitude. In addition, with the present invention, when configuring so that the value of the motor-generated-torque command signal does not exceed the limit value according to the motor revolution speed, since the amplitude not of the DC signal set in association with the acceleration, etc., but rather the AC signal set in association with the excitation force is suppressed, it is possible to prevent the average torque from deviating accompanying suppression of the amplitude. In addition, by preventing the average torque from deviating, it is possible to generate a motor-generated-torque command signal such that can maximize the excitation force, while ensuring the required acceleration, etc.

The second aspect of the present invention calculates the surplus amplitude by subtracting the limit value from the sum of the value of the DC signal and the value of a predetermined base amplitude. This surplus amplitude corresponds to a surplus amount by which exceeding the limit value in the motor-generated-torque command signal generated, in the case of defining the amplitude of the AC signal as the above-mentioned base amplitude. With the present invention, it is possible to prevent the value of the motor-generated-torque command signal from exceeding the limit value by generating an AC signal of an amplitude obtained by subtracting the above-mentioned surplus amplitude from the base amplitude. In addition, the present invention calculates a surplus amplitude irrespective of a feedback loop, and generates the motor-generated-torque command signal using this surplus amplitude. In other words, since the present invention generates the motor-generated-torque command signal so as not to exceed the limit value by way of an open loop structure, in the case of varying the frequency of the AC signal or base amplitude, it is possible to quickly follow this change.

In the case of performing excitation according to the AC component using the motor-generated-torque command signal in which the AC component overlap as in the third aspect of the present invention, when the frequency rises, eddy current loss occurs and heat tends to generate in the motor. The present invention calculates the limit amplitude according to the frequency of the AC signal, separately from the above-mentioned limit value, then compares between the amplitude calculated so as not to exceed the limit value (base amplitude–surplus amplitude) and this limit amplitude, and generates an AC signal of the smaller amplitude. It is thereby possible to generate a motor-generated-torque command signal that is appropriately limited to within the operating range established from the revolution speed of the motor (i.e. within the operating range established according to the limit value) and within the operating range established from the excitation frequency of the motor (i.e. within the operating range established according to the limit amplitude).

The fourth aspect of the present invention generates an AC signal by generating a base AC signal, and then multiplying the amplitude attenuation coefficient determined so that there is no deviation between the maximum value of the motor-generated-torque command signal and the limit value, by the value of this base AC signal. By generating an AC signal such that the motor-generated-torque command signal does not exceed the limit value by multiplying the amplitude attenuation coefficient by the value of the base AC signal in this way, it is possible to make the base AC signal not simply a sine wave, but rather a strain wave following high-order frequency components. Therefore, it is possible to generate a motor-generated-torque command signal of a strain wave close to the combustion waveform of an actual engine, within the operating range established from the revolution speed of the motor. In addition, with the present invention, contrary to the above-mentioned second aspect of the present invention, a feedback loop is involved in the reduction of the AC component of the motor-generated-torque command signal. For this reason, the present invention can include a module having a function of varying the amplitude of the AC component (e.g., the resonance suppression controller described later) inside this feedback loop.

The fifth aspect of the present invention detects the frequency component of the motor-generated-torque command signal by way of the frequency component detection means, and further calculates the ratio of the amplitude detected by the frequency component detection means relative to the above-mentioned limit amplitude for each of a plurality of different frequencies. Then, by determining the amplitude attenuation coefficient so that the largest ratio among these ratios calculated for every frequency becomes a predetermined target value, it is possible to generate a motor-generated-torque command signal that is appropriately limited to within the operating range established from the motor revolution speed and within an operating range established from the frequency of the motor.

The sixth aspect of the present invention calculates the positive (e.g., driving direction) and negative (e.g., absorbing direction) torque limit base values according to the revolution speed of the motor, and calculates the positive and negative torque limit values by correcting these base values. Then, the motor generated torque command signal is generated by discarding values exceeding these torque limit values from the base signal. By generating a motor-generated-torque command signal so as not to exceed the limit value in the torque command generation device in this way, it is possible to prevent being forcibly discarded in an unintended state in the motor driving device subsequently, and the average torque deviating from the intended magnitude. In addition, the present invention, in the case of a surplus occurring in the base signal relative to the torque limit base value of either one sign of positive and negative, corrects the torque limit base value of the opposite sign to the one in which this surplus occurred so that the absolute value thereof becomes smaller, i.e. the amplitude is further limited. In the case of surplus occurring in either one sign of positive and negative in the base signal, since not only discarding the one sign side, but also discarding the other sign side, it is thereby possible to prevent the average torque from deviating accompanying the discarding. In addition, by preventing the average torque from deviating, it is possible to generate a motor-generated-torque command signal such that can maximize the excitation force, while ensuring the required acceleration, etc.

The seventh aspect of the present invention, in the case of surplus occurring in the base signal relative to the torque limit base value of either one sign among positive and negative, corrects this torque limit base value by adding a value obtained by subtracting the torque limit base value of the above-mentioned one sign side from the sum of the value of the DC component of the base signal and the extreme value on the above-mentioned one sign side, to the torque limit base value of the other sign side. In the case of surplus occurring on either one side of positive and negative, the base signal has the surplus amount symmetrically discarded on both sides of positive and negative. It is thereby possible to make both the decline in the excitation force proportional to the amplitude of the AC component of the motor-generated-torque command signal and the deviation of the average torque to be minimums.

PREFERRED MODE FOR CARRYING OUT THE INVENTION

Hereinafter, an embodiment of the present invention will be explained in detail while referencing the drawings.

Figure 1:
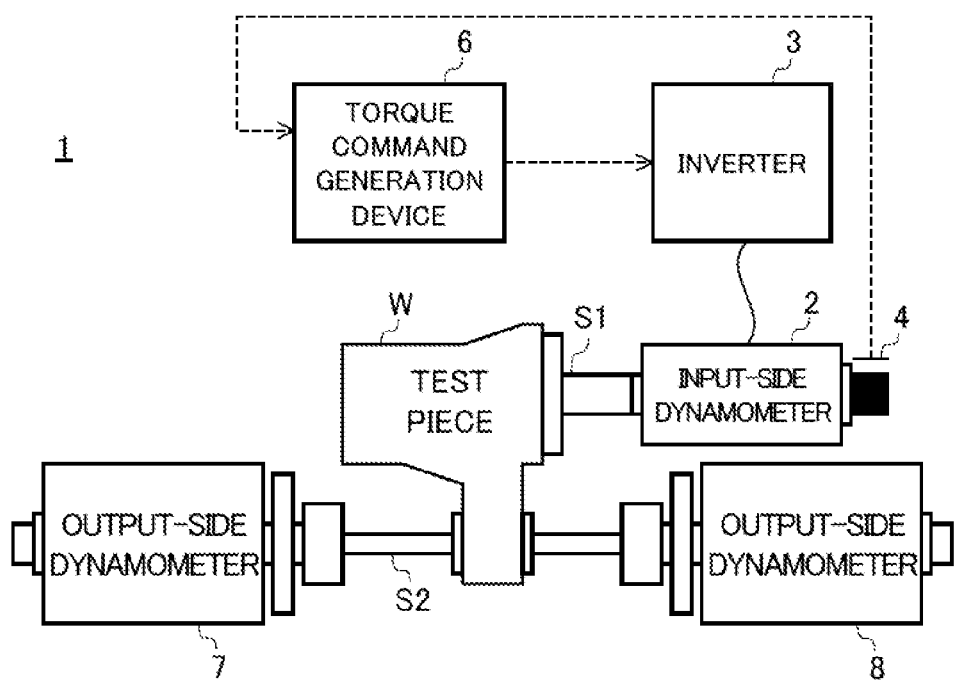
FIG. 1 is a block diagram showing the configuration of a test system for drivetrains to which a torque command generation device according to an embodiment of the present invention is incorporated.

FIG. 1 is a block diagram showing the configuration of a test system 1 for drivetrains in which a torque command generation device 6 according to the present embodiment is incorporated. It should be noted that, although an example of the test system 1 in which the transmission of a FF drive-type vehicle is established as a test piece W, the present invention is not limited thereto. The test piece W may be the transmission of a FR drive-type vehicle.

The test system 1 includes: an input-side dynamometer 2 that is coaxially coupled with the input shaft S1 of the test piece W; an inverter 3 that supplies electric power to this input-side dynamometer 2; a rotation detector 4 that detects the revolution speed (angular speed) of the input-side dynamometer 2; a torque command generation device 6 that generates a motor-generated-torque command signal based on a detected value, etc. of this rotation detector 4; and output-side dynamometers 7,8 coupled to both ends of the output shaft S2 of the test piece, respectively.

The rotation detector 4 detects the revolution speed of the input-side dynamometer 2, and sends a signal substantially proportional to the detected value to the torque command generation device 6. Hereinafter, the revolution speed of the input-side dynamometer is referred to as "motor revolution speed".

The inverter 3 converts DC electric power supplied from a DC power source not illustrated into AC electric power, and supplies to the input-side dynamometer 2. The torque command generation device 6 generates a motor-generated-torque command signal for driving the input-side dynamometer 2, based on the motor revolution speed detected by the rotation detector 4, and inputs to the inverter 3. The detailed configuration of this torque command generation device 6 will be explained later in each example.

With the test system 1, the durability performance, product quality, etc. of the test piece W are evaluated by causing a torque imitating an actual engine to be generated by the input-side dynamometer 2, and absorbing the transmission output of the test piece W by the output-side dynamometers 7 and 8, while inputting this torque to the input shaft S1 of the test piece W.

Example 1

Next, Example 1 of the torque command generation device of the above-mentioned embodiment will be explained while referencing the drawings.

Figure 2:
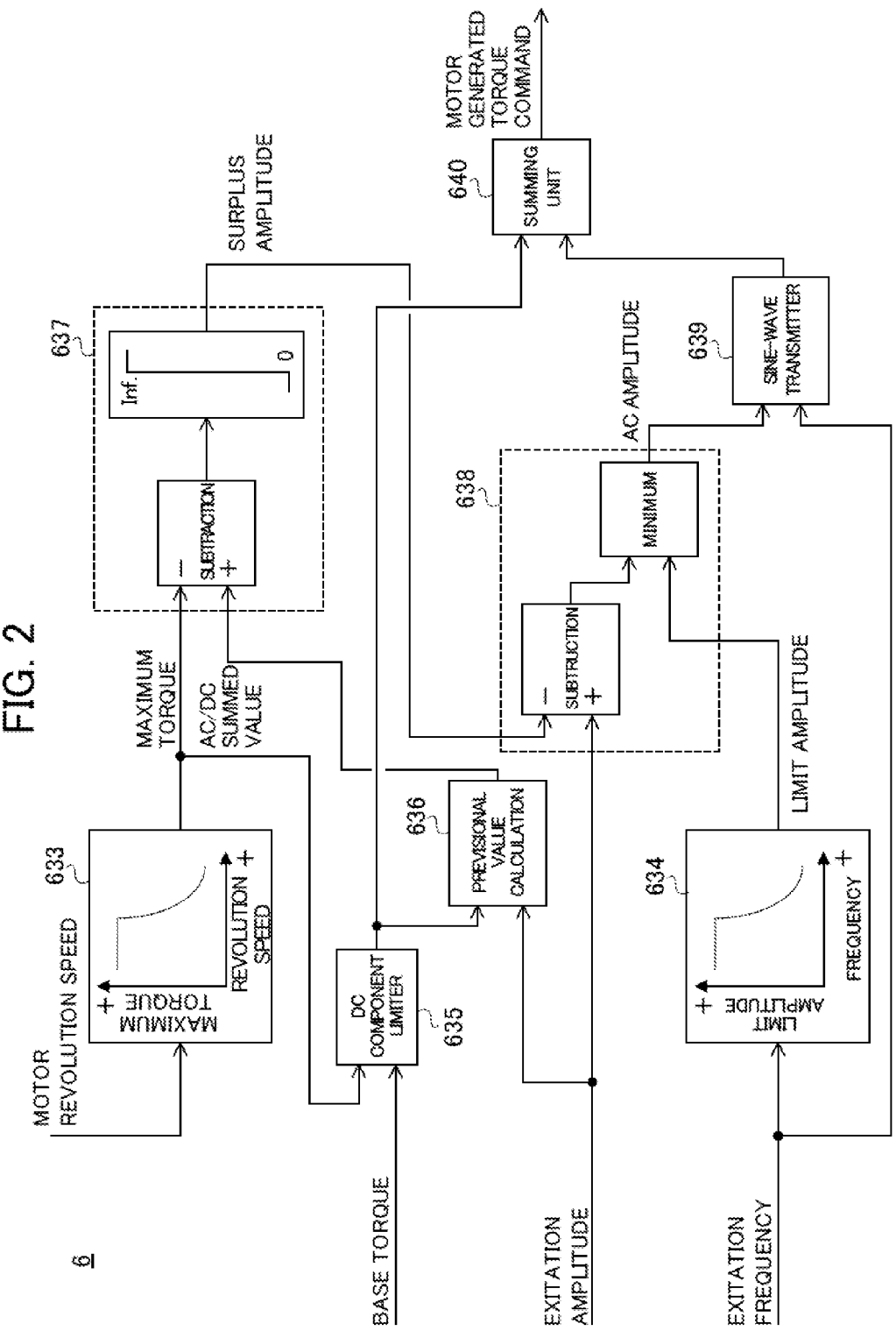
FIG. 2 is a block diagram showing the configuration of a torque command generation device of Example 1.

FIG. 2 is a block diagram showing the configuration of the torque command generation device 6 of the present example.

When command values for the base torque, excitation frequency and excitation amplitude are inputted from an external computational device that is not illustrated, the torque command generation device 6 generates a motor-generated-torque command signal according to these inputs, and inputs to the inverter 3. The motor-generated-torque command signal generated by the torque command generation device 6 is basically a signal made by compositing a DC signal serving as the base torque, and a sine wave signal of a frequency and amplitude according to the excitation frequency and excitation amplitude. However, as explained below, predetermined limits are provided for the amplitudes of the DC signal and sine wave signal. Herein, base torque corresponds to a component arrived at by excluding a torque pulse component of an engine, in the torque generating by the dynamometer to imitate a real engine, and excitation frequency and excitation amplitude correspond to the frequency and amplitude of the above-mentioned torque pulse component. Hereinafter, the specific sequence of calculating the value of the motor-generated-torque command signal in the torque command generation device 6 will be explained.

A maximum torque calculation unit 633 calculates a value of the maximum torque, which is a limiting value for the motor-generated-torque command signal, by way of searching a map established in advance based on the motor revolution speed detected by the rotation detector. As explained below, the torque command generation device 6 generates a motor-generated-torque command signal so as not to exceed the maximum torque value calculated by the maximum torque calculation unit 633. According to the map exemplified in FIG. 2, the maximum torque value is set to a smaller value as the motor revolution speed increases, by considering the heat generation characteristics, mechanical strength, etc. of the input-side dynamometer.

A limit amplitude calculation unit 634 calculates a limit amplitude serving as a limiting value for the amplitude of the AC component of the motor-generated-torque command signal, by searching a map established in advance based on the excitation frequency inputted from outside. As explained below, the torque command generation device 6 generates a motor-generated-torque command signal so that the amplitude of this AC component does not exceed the limit amplitude calculated by the limit amplitude calculation unit 634. The input-side dynamometer considers the aspect of demagnetizing with less torque as the excitation frequency rises, and the limit amplitude is set so as to decrease as the excitation frequency rises as shown in the map exemplified in FIG. 2.

Among a command value for the base torque inputted from outside and a maximum torque value calculated by the maximum torque calculation unit 633, a DC component limiter 635 establishes the smaller one as a decided DC component value. As described later in detail, the decided DC component value calculated by the DC component limiter 635 serves as the DC component value of the motor-generated-torque command signal. Therefore, this DC component limiter 635 has a function of generating the DC signal of the motor-generated-torque command signal.

A provisional value calculation unit 636 calculates an AC/DC summed value by summing the decided DC component value and the command value for the excitation amplitude inputted from outside. This AC/DC summed value corresponds to a provisional value of the motor-generated-torque command signal prior to conducting limitation on the AC component.

A surplus amplitude calculation unit 637 calculates a surplus amplitude by subtracting the maximum torque value from the AC/DC summed value. This surplus amplitude corresponds to the amplitude that should be excluded from the AC component in order to make so that the value of the motor-generated-torque command signal does not exceed the maximum torque value. Therefore, in the case of the value obtained by subtracting the maximum torque value from the AC/DC summed value being negative, since it means that it is not necessary to limit the amplitude of the AC component, surplus amplitude is set as 0 in this case.

An AC component limiter 638 compares between the amplitude obtained by subtracting the surplus amplitude from the excitation amplitude inputted from outside and the limit amplitude calculated by the limit amplitude calculation unit 634, and then sets the smaller one as the decided AC amplitude. A sine-wave transmitter 639 generates a sine wave of the excitation frequency and the decided AC amplitude calculated by the AC component limiter 638.

A summing unit 640 calculates a value of the motor-generated-torque command signal by summing the decided DC component value calculated by the DC component limiter 635 and the value of the sine wave generated by the sine-wave transmitter 639. For the amplitude of the sine wave generated by the sine-wave transmitter 639, the surplus amplitude is removed by the function of the above-mentioned AC component limiter 638. Therefore, the motor-generated-torque command signal generated by the summing unit 640 is limited to no more than the maximum torque value. In addition, the amplitude of the sine wave generated by the sine-wave transmitter 639 is limited to no more than the limit amplitude by way of the function of the AC component limiter 638. Therefore, the amplitude of the AC component of the motor-generated-torque command signal generated by the summing unit 640 is limited to no more than the limit amplitude.

The following effects are exerted according to Example 1 explained above.

(1) Example 1 generates an AC signal of an amplitude such that the value of the motor-generated-torque command signal does not exceed the maximum torque value calculated according to the motor revolution speed. It is thereby possible to prevent the generated motor-generated-torque command signal from being forcedly discarded in an unintended state of the inverter, and the average torque deviating from the intended magnitude. In addition, in Example 1, since not the amplitude of the DC component, but rather the AC component of the motor-generated-torque command signal is suppressed, it is possible to prevent the average torque from deviating. In addition, by preventing the average torque from deviating, it is possible to generate a motor-generated-torque command signal such that can maximize the excitation force while ensuring the necessary acceleration, etc.

(2) In Example 1, it is possible to prevent the value of the motor-generated-torque command signal from exceeding the maximum torque value, by generating a sine wave of an amplitude obtained by subtracting the surplus amplitude calculated by the surplus amplitude calculation unit 637 from the excitation amplitude inputted from outside. In addition, as shown in FIG. 2, since a motor-generated-torque command signal so as not to exceed the maximum torque value is generated by an open loop structure, in the case of the command values for base torque, excitation frequency, excitation amplitude, etc. being changed, it is possible to quickly follow this change.

(3) In Example 1, the limit amplitude according to the excitation frequency is calculated by the limit amplitude calculation unit 634, separately from the maximum torque value. Then, the AC component limiter 638 compares between the amplitude obtained by subtracting the surplus amplitude from the excitation amplitude inputted from outside and the above-mentioned limit amplitude, and sets the smaller one as the decided AC amplitude. It is thereby possible to generate a motor-generated-torque command value that is appropriately limited to within the operating range established according to the maximum torque value appropriately limited to and within established according to the limit amplitude.

In Example 1 explained above, the DC component limiter 635, etc. correspond to a DC signal generation means, the summing unit 640 corresponds to a compositing means; and the maximum torque calculation unit 633, limit amplitude calculation unit 634, provisional value calculation unit 636, surplus amplitude calculation unit 637, AC component limiter 638 and sine-wave transmitter 639 correspond to an AC signal generation means. In more detail, the maximum torque calculation unit 633 corresponds to a limit value calculation means, the limit amplitude calculation unit 634 corresponds to a limit amplitude calculation means, the provisional value calculation unit 636 and surplus amplitude calculation unit 637 correspond to a surplus amplitude calculation means, and the AC component limiter 638 and sine-wave transmitter 639 correspond to a transmitting means.

Example 2

Next, Example 2 of the torque command generation device of the above-mentioned embodiment will be explained while referencing the drawings. It should be noted that in the following explanation of Example 2, configurations that are the same as Example 1 will be assigned the same reference symbol, and a detailed explanation will be omitted.

Figure 3:
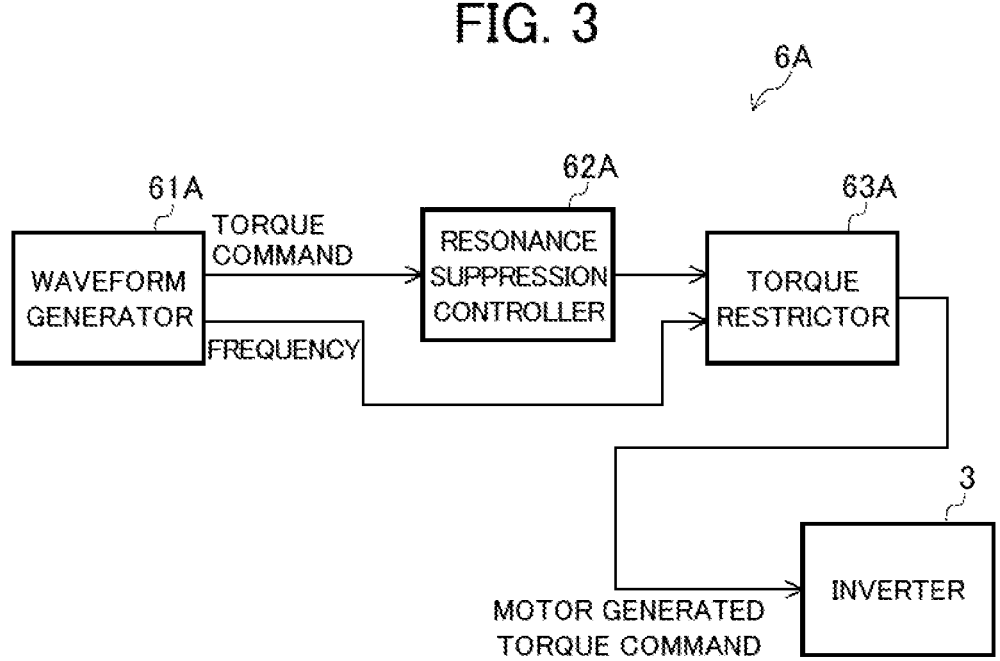
FIG. 3 is a block diagram showing the configuration of a torque command generation device of Example 2.

FIG. 3 is a block diagram showing the configuration of a torque command generation device 6A of the present example.

The torque command generation device 6A includes a waveform generator 61A, a resonance suppression controller 62A and a torque restrictor 63A. The torque command generation device 6A generates a primary torque command signal by way of the waveform generator 61A, inputs this to the resonance suppression controller 62A and torque restrictor 63A, sets a signal arrived at by subjecting to the processing of these as the final motor-generated torque command signal, and inputs to the inverter 3.

When the base torque command value, excitation frequency command value and excitation amplitude command value are inputted from an external arithmetic unit that is not illustrated, the waveform generator 61A generates a torque command signal according to these inputs. The waveform generator 61 generates a torque command signal by compositing the DC signal of a level proportionate to the base torque command value, and a sine-wave signal of a frequency and amplitude according to the excitation frequency command value and excitation amplitude command value.

The resonance suppression controller 62A suppresses the resonance phenomenon, which occurs accompanying excitation of a mechanical system according to the excitation frequency, by way of causing the amplitude in the vicinity of a resonance point of the mechanical system consisting of the input-side dynamometer 2, test piece W, etc. to attenuate for the torque command signal generated by the waveform generator 61A. The torque restrictor 63A generates a motor-generated-torque command signal by conducting the processing shown in FIG. 4 on the torque command signal arrived at by subjecting to the above-mentioned resonance suppression controller, and inputs to the inverter 3.

Figure 4:
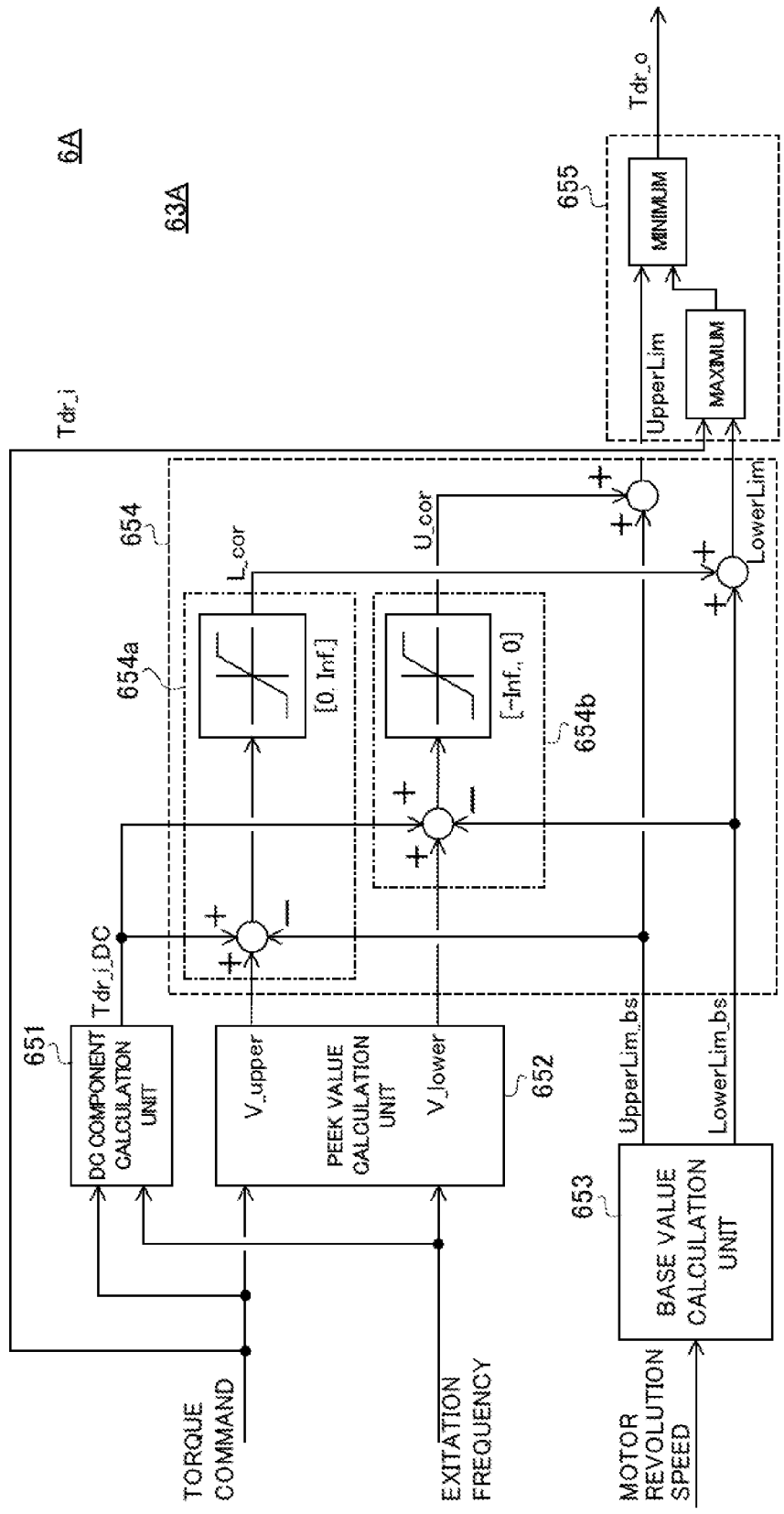
FIG. 4 is a block diagram showing a sequence of specific calculation processing to calculate the value of a motor-generated-torque command signal of a torque restrictor.

FIG. 4 is a block diagram showing a specific sequence of calculating the value of the motor-generated-torque command signal in the torque restrictor 63A of the torque command generation device 6A in the present example.

The DC component calculation unit 651 calculates the value of the DC component of the torque command signal during one period sought from the excitation frequency. Hereinafter, the torque command signal is indicated by "Tdr_i", and the DC component value of the torque command signal calculated by the DC component calculation unit 651 is indicated by "Tdr_i_DC". A peak value calculation unit 652 calculates a maximum value and minimum value for the torque command signal during one period demanded from the excitation frequency. Hereinafter, the maximum value of the torque command signal calculated by the peak value calculation unit 652 is indicated by "V_upper", and the minimum value thereof is indicated by "V_lower".

A base value calculation unit 653 calculates positive and negative maximum torque base values serving as the base values of the limit values for the value of the motor-generated-torque command signal, by searching a map established in advance based on the motor revolution speed detected by the rotation detector. Hereinafter, the positive maximum torque base value is indicated by "UpperLim_bs (≥0)", referring to the maximum torque base upper limit. In addition, the negative maximum torque base value is indicated by "LowerLim_bs (<0)", referring to the maximum torque base lower limit. Similarly to the maximum torque calculation unit 633 of FIG. 2, the map deciding the these maximum torque base upper and lower limits is established by considering the heat generation characteristics and mechanical strength of the input-side dynamometer. More specifically, for example, the maximum torque base upper limit is set to a smaller value on the positive side as the motor revolution speed increases, and the maximum torque base lower limit is set to a smaller value on the negative side as the motor revolution speed increases.

A correction calculation unit 654 calculates a positive maximum torque upper limit and a negative maximum torque lower limit by correcting the above-mentioned maximum torque base upper limit UpperLim_bs and lower limit LowerLim_bs so that the absolute values thereof become smaller, based on DC component value Tdr_iDC, maximum value V_upper and minimum value V_lower of the torque command signal. Hereinafter, the maximum torque upper limit is indicated by "UpperLim (≥0)", and the maximum torque lower limit is indicated by "LowerLim (<0)". Hereinafter, the specific sequence of correction by the correction calculation unit 654 will be explained.

The correction calculation unit 654 sets a value arrived at by adding the positive lower limit correction value L_cor (>0) calculated by a lower limit correction value calculation unit 654a to the maximum torque base lower limit LowerLim_bs as the maximum torque lower limit LowerLim (refer to formula (1) below), and sets a value arrived at by adding a negative upper limit correction value U_cor (<0) calculated by an upper limit correction value calculation unit 654b to the maximum torque base upper limit UpperLim_bs as a maximum torque upper limit value UpperLim (refer to formula (2) below).

$$\text{LowerLim} = \text{LowerLim}\_{bs} + L\_cor \quad (1)$$

$$\text{UpperLim} = \text{UpperLim}\_{bs} + U\_cor \quad (2)$$

The lower limit correction value calculation unit 654a sets a value obtained by subtracting the maximum torque base upper limit UpperLim_bs from the sum of the maximum value V_upper of the torque command signal and the DC component value Tdr_i_DC, as the lower limit corrected value L_cor, as shown in formula (3) below. Herein, since the negative maximum torque base lower limit LowerLim_bs is corrected so the absolute value thereof becomes smaller, the lower limit corrected value L_cor is limited to be a positive value. In other words, in the case of the value on the right side in formula (3) below becoming negative, the lower limit corrected value L_cor is set to 0.

$$L\_cor = V\_\text{upper} + Tdr\_i\_DC - \text{UpperLim}\_{bs} \quad (3)$$

The upper limit correction value calculation unit 654b sets a value obtained by subtracting the maximum torque base lower limit LowerLim_bs from the sum of the minimum value V_lower of the torque command signal and the DC component value Tdr_iDC, as the upper limit correction value U_cor, as shown in formula (4) below. Herein, since the positive maximum torque base upper limit UpperLim_bs is corrected so that the absolute value thereof becomes smaller, the upper limit corrected value U_cor is limited so as to be a negative value. In other words, in a case of the value on the right side of formula (4) below becoming positive, the upper limit correction value U_cor is set to 0.

$$U\_cor = V\_\text{Lower} + Tdr\_i\_DC - \text{LowerLim}\_{bs} \quad (4)$$

The torque limiter 655 generates a motor-generated-torque command signal Tdr_o by discarding values larger than the maximum torque upper limit UpperLim and values smaller than the maximum torque lower limit LowerLim calculated by the correction calculation unit 654, from the torque command signal Tdr_i.

Figure 5:
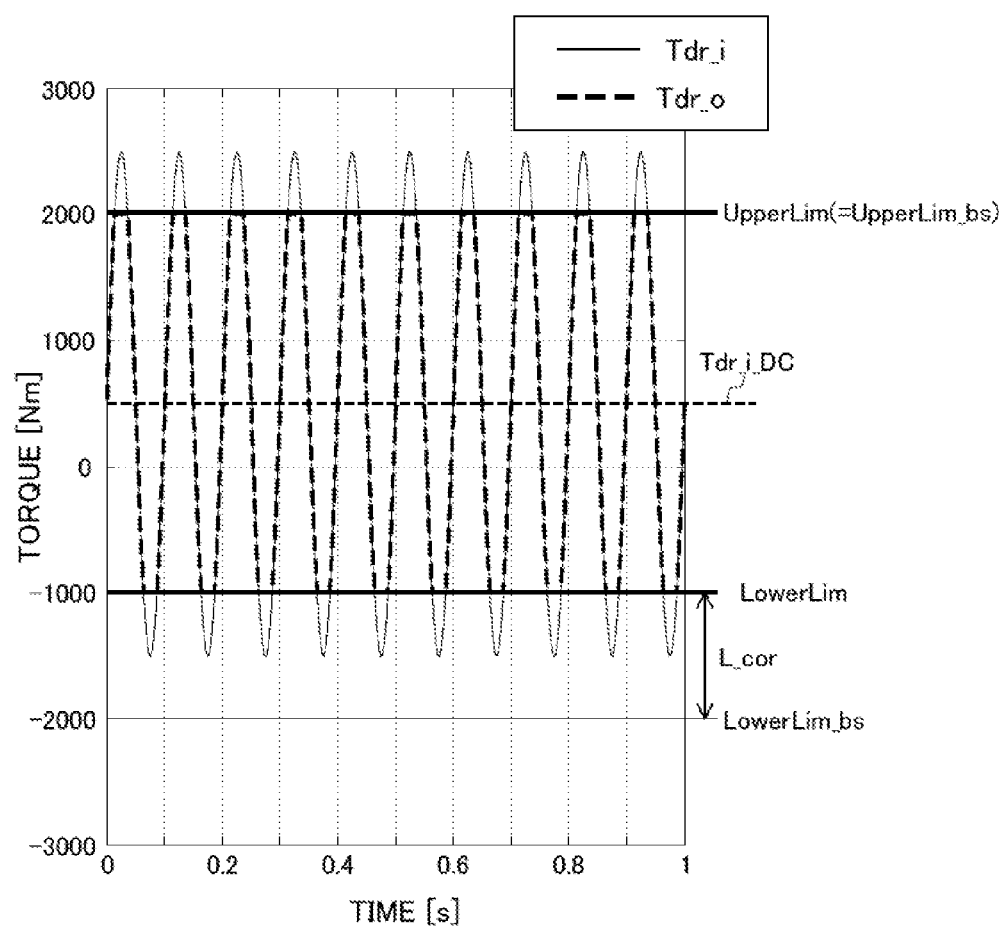
FIG. 5 is a view showing a specific example of a motor-generated-torque command signal generated by the torque restrictor.

FIG. 5 is a graph showing a specific example of a motor-generated-torque command signal generated by the torque restrictor of Example 2. In FIG. 5, the thin solid line indicates the torque command signal Tdr_i, and the thick dotted line indicates the motor-generated-torque command signal Tdr_o obtained by the torque restrictor of Example 2. More specifically, a signal obtained by compositing a DC signal of 500 (Nm) (Tdr_i_DC=500) with an AC signal characterized by an excitation amplitude of 2000 (Nm) and excitation frequency of 10 (Hz) (Tdr_i_AC=2000*sin (10*2πt)) is used in the torque command signal Tdr_i. In addition, the maximum torque base upper limit UpperLim_bs is set as 2000 (Nm), and the maximum torque base lower limit LowerLim_bs is set as −2000 (Nm).

As shown in FIG. 5, a surplus of 500 (Nm) arises relative to the positive maximum torque base upper limit UpperLim_bs in the torque command signal shown by the thin solid line. In this case, a value arrived at by adding the lower limit corrected value L_cor of 1000 (Nm) to the maximum torque base lower limit LowerLim_bs of the opposite sign as the UpperLim_bs for which surplus occurred becomes the maximum torque lower limit LowerLim, according to the function of the correction calculation unit 654 of FIG. 4. For this reason, the torque command signal Tdr_i is discarded also on the negative side by the same amount as the surplus occurring on the positive side, as shown in FIG. 5. Therefore, the average torque is maintained as is at 500 (Nm) with the torque command signal Tdr_i and motor-generated-torque command signal Tdr_o.

The following effects are exerted according to Example 2 explained above.

(4) In Example 2, the maximum torque base upper limit UpperLim_bs and lower limit LowerLim_bs are calculated according to the motor revolution speed, and the maximum torque upper limit UpperLim and lower limit LowerLim are calculated by correcting these base values. Then, the motor-generated-torque command signal Tdr_o is generated by discarding values exceeding these limit values UpperLim, LowerLim from the torque command signal Tdr_i. It is thereby possible to prevent the generated motor-generated-torque command signal from being forcedly discarded in an unintended state in the inverter, and the average torque shifting from the intended magnitude. In addition, in Example 2, it is also possible to generate a motor-generated-torque command signal so as to maximize the excitation force while maintaining the required acceleration, etc., by preventing the average torque from deviating.

(5) In Example 2, in the case of surplus occurring relative to the limit value of either one sign of positive and negative (UpperLim_bs, LowerLim_bs) in the torque command signal Tdr_i, this limit value (UpperLim_bs, LowerLim_bs) is corrected by adding a value obtained by subtracting the limit value on the above-mentioned one sign side (UpperLim_bs, LowerLim_bs) from the sum of the DC component value Tdr_i_DC of the torque command signal Tdr_i and the extreme value (V_Upper, V_Lower) on the above-mentioned one sign side of the torque command signal, to the limit value on the other sign side (UpperLim_bs, LowerLim_bs). In the case of a surplus occurring on either one side of positive and negative, the torque command signal Tdr_i has the surplus amount discarded symmetrically on both sides of positive and negative, as explained referencing FIG. 5. It is thereby possible to make both the decline in the excitation force proportional to the amplitude of the AC component of the motor-generated-torque command signal Tdr_o and the deviation of average torque to be minimums. In addition, according to Example 2, since the motor-generated-torque command signal limited as shown in FIG. 5 becomes close to a square wave, it is possible to increase the root mean squared value of the AC component compared to Example 1.

In Example 2 explained above, the base value calculation unit 653 corresponds to a base value calculation means, the correction calculation unit 654 corresponds to a correction means, and the torque limiter 655 corresponds to a torque command generation means.

Example 3

Next, Example 3 of the torque command generation device of the above-mentioned embodiment will be explained while referencing the drawings.

Figure 6:
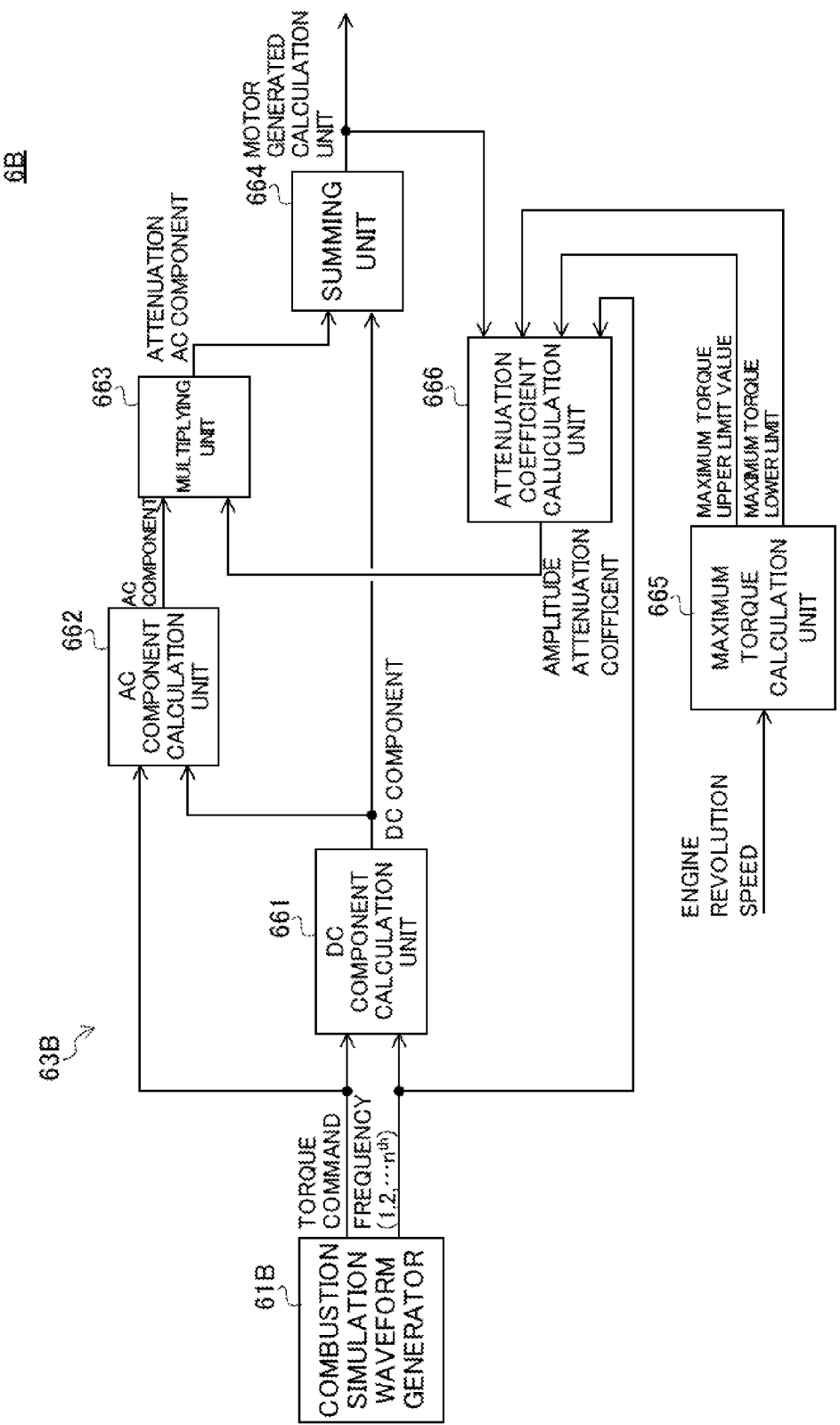
FIG. 6 is a block diagram showing the configuration of a torque command generation device of Example 3.

FIG. 6 is a block diagram showing the configuration of a torque command generation device 6B of the present example.

The torque command generation device 6B includes a combustion simulation waveform generator 61B that generates a primary torque command signal; and a torque restrictor 63B that generates a motor-generated-torque command signal by conducting the limit processing explained below on the torque command signal generated by the combustion simulation waveform generator 61B.

The combustion simulation waveform generator 61B generates a signal of a waveform imitating the generated torque of an actual engine as the torque command signal.

Figure 7:
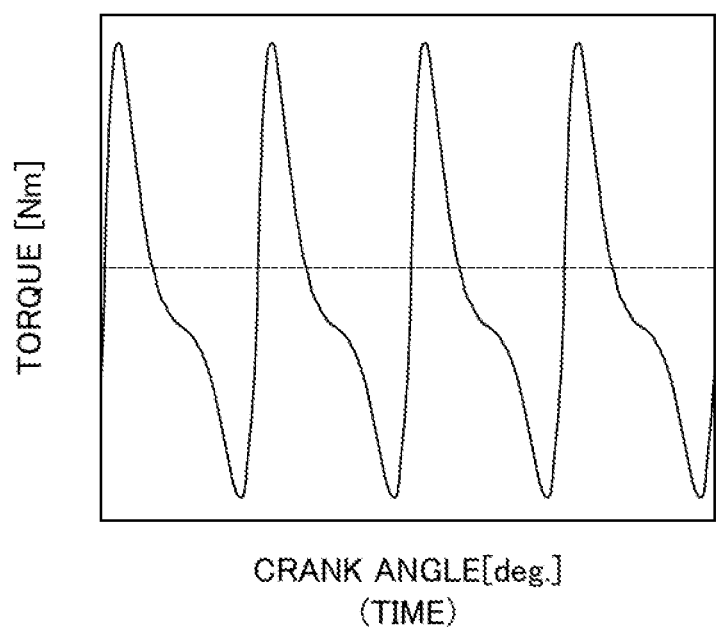
FIG. 7 is a graph showing an example of a torque command signal generated by a combustion simulation waveform generator.

FIG. 7 is a view showing an example of a torque command signal generated by a combustion simulation waveform generator 61B. In order to perform a test more closely to an actual engine, the combustion simulation waveform generator 61B outputs a strain wave generated by compositing a DC signal and an AC signal containing a plurality of frequency components as the torque command signal.

Referring back to FIG. 6, the torque restrictor 63B is configured to include a DC component calculation unit 661 that calculates the value of a DC component of the torque command signal; an AC component calculation unit 662 that calculates the value of an AC component of the torque command signal; a multiplying unit 663 that attenuates the amplitude of the AC signal by multiplying a predetermined amplitude attenuation coefficient; a summing unit 664 that composites the AC signal with attenuated amplitude and the DC signal again to generate a motor-generated-torque command signal; a maximum torque calculation unit 665 that calculates the maximum torque value serving as a limit value for the value of the motor-generated-torque command signal; and an attenuation coefficient calculation unit 666 that calculates the amplitude attenuation coefficient. Hereinafter, these functions will be specifically explained.

The DC component calculation unit 661 calculates the value of the DC component of the torque command signal during one cycle sought from the lowest order frequency of the torque command signal. The AC component calculation unit 662 calculates the value of the AC component of the torque command signal by subtracting the value of the DC component calculated by the DC component calculation unit 661 from the value of the torque command signal.

The maximum torque calculation unit 665 calculates the positive maximum torque upper limit value and the negative maximum torque lower limit value serving as the limit values for the motor-generated-torque command signal, by searching a map established in advance based on the motor revolution speed detected by the rotation detector. It should be noted that the map determining this maximum torque upper limit value and lower limit value is the same as that used for the base value calculation unit 653 explained referencing FIG. 4 in Example 2; therefore, a detailed explanation will be omitted.

The attenuation coefficient calculation unit 666 calculates the amplitude attenuation coefficient following the sequence explained later by referencing FIG. 8, so that the value of the motor-generated-torque command signal is no more than the maximum torque upper limit value and at least the maximum torque lower limit value calculated by the maximum torque calculation unit 665.

The multiplying unit 663 multiplies the amplitude attenuation coefficient calculated by the attenuation coefficient calculation unit 666 by the value of the AC component calculated by the AC component calculation unit 662, and sets this as the attenuated AC component value.

The summing unit 664 calculates the value of the motor-generated-torque command signal by summing the DC component value calculated by the DC component calculation unit 661 and the attenuated AC component value calculated by the multiplying unit 663. The above-mentioned amplitude attenuation coefficient is determined so that the value of the motor-generated-torque command signal becomes within the range between the maximum torque upper limit value and maximum torque lower limit value, according to the function of the attenuation coefficient calculation unit 666. Therefore, the motor-generated-torque command signal generated by the summing unit 664 is mostly limited to within the range between the maximum torque upper limit value and maximum torque lower limit value.

Figure 8:
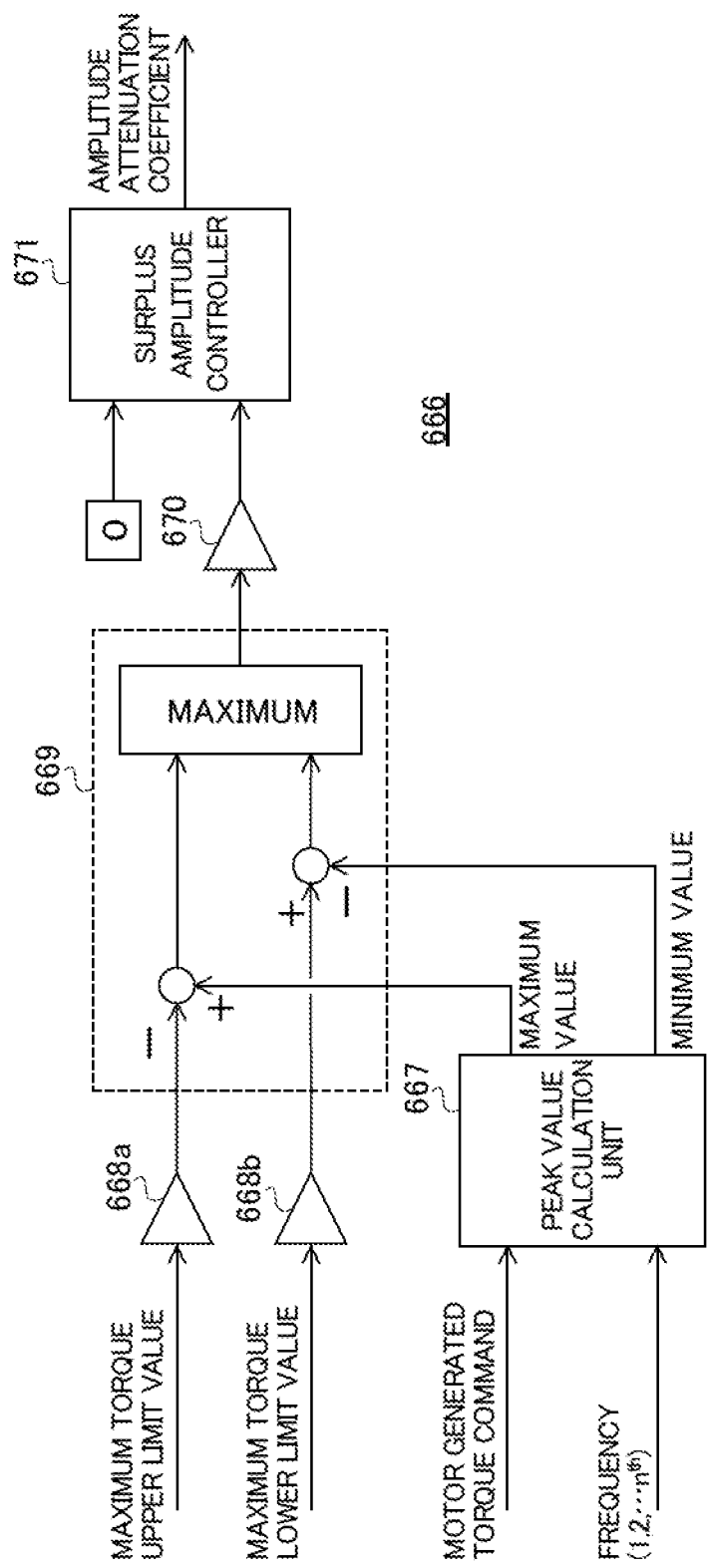
FIG. 8 is a block diagram showing a specific sequence of calculating an amplitude attenuation coefficient in an attenuation coefficient calculation unit.

FIG. 8 is a block diagram showing a specific sequence of calculating the amplitude attenuation coefficient in the attenuation coefficient calculation unit 666.

The peak value calculation unit 667 calculates the maximum value and minimum value of the motor-generated-torque command signal during one cycle sought from the lowest order frequency of the torque command signal. Multiplying units 668a, 668b multiply a predetermined margin coefficient that is smaller than 1 (e.g., 0.95) by the positive maximum torque upper limit value and negative maximum torque lower limit value.

A deviation calculation unit 669 sets whichever one is larger among the surplus amplitude on the drive side obtained by subtracting the maximum torque upper limit value from the maximum value of the motor-generated-torque command signal, and the surplus amplitude on the absorbing side obtained by subtracting the minimum value of the motor-generated-torque command signal from the maximum torque lower limit value.

A multiplying unit 670 calculates the non-dimensionalized deviation by multiplying a predetermined coefficient by the surplus amplitude having the dimension of torque. A surplus amplitude control 671 calculates the amplitude attenuation coefficient such that the deviation calculated by the multiplying unit 670 disappears. A controller with a built-in integrator that sets steady-state deviation to 0 is used in this surplus amplitude controller 671.

In addition to the effect of (1) of Example 1, the following effects are exerted according to Example 3 explained above.

(6) In Example 3, the amplitude attenuation coefficient is determined so that the deviation between the maximum value (or minimum value) of the motor-generated-torque command signal and the maximum torque upper limit value (or lower limit value) disappears, and the AC component of the motor-generated-torque command signal is determined by multiplying this by the AC component value extracted from the torque command signal. It is thereby possible to make the base AC signal generated by the combustion simulation waveform generation unit 61B to be a strain signal such as that shown in FIG. 7. Therefore, it is possible to generate a motor-generated-torque command signal of a strain wave close to the combustion waveform of an actual engine, within an operating range determined from the motor revolution speed.

Figure 9:
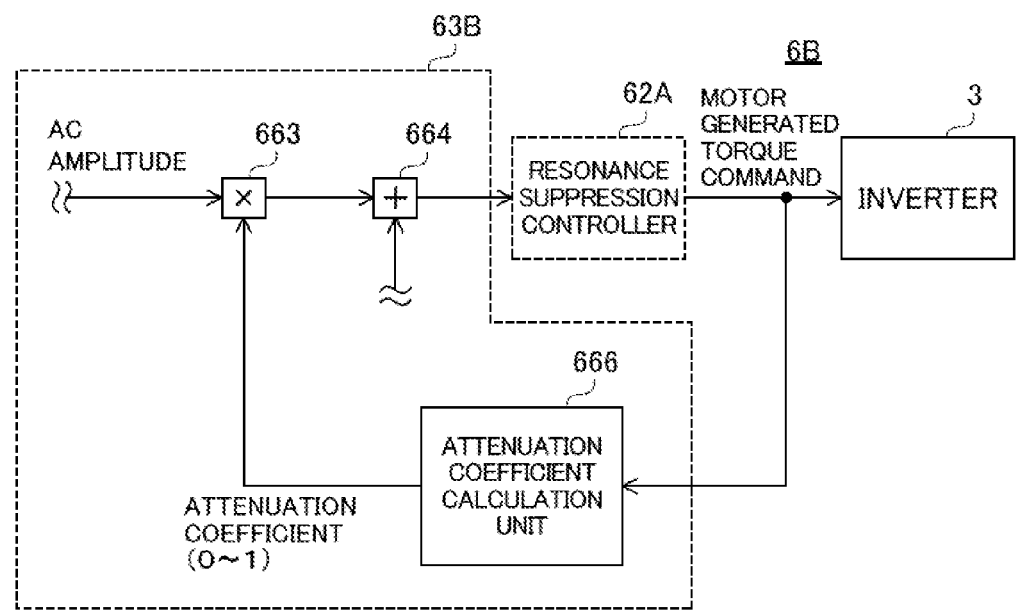
FIG. 9 is a view made by extracting only modules related to the determination of the amplitude of an AC component of the motor-generated-command signal, in the torque command generation device of Example 3.

FIG. 9 is a view made by extracting only modules related to the determination of the amplitude of an AC component of the motor-generated-command signal, in the torque command generation 6B device of Example 3 shown in FIG. 6.

As is clear by comparing Example 3 shown in FIG. 9 and Example 2 shown in FIG. 3, with the torque command generation device 6B of Example 3, the computation of the amplitude attenuation coefficient to reduce the AC component of the motor-generated-torque command signal follows a feedback loop. For this reason, with Example 3, it is possible to include a resonance suppression controller 62A having a function of varying the amplitude of the AC component in this feedback loop.

In Example 3 explained above, the maximum torque calculation unit 665 corresponds to a limit value calculation means, the DC component calculation unit 661 corresponds to a DC signal generation means, the summing unit 664 corresponds to a compositing means, and the AC component calculation unit 662, multiplying unit 663 and attenuation coefficient calculation unit 666 correspond to an AC signal generation means. In more detail, the AC component calculation unit 662 corresponds to a base signal generation means, the multiplying unit 663 corresponds to a multiplying means, and the surplus amplitude controller 671 corresponds to a surplus amplitude limiting means.

Example 4

Next, Example 4 of the torque command generation device of the above-mentioned embodiment will be explained while referencing the drawings. It should be noted that in the following explanation of Example 4, configurations that are the same as Example 3 will be assigned the same reference symbol, and a detailed explanation will be omitted.

Figure 10:
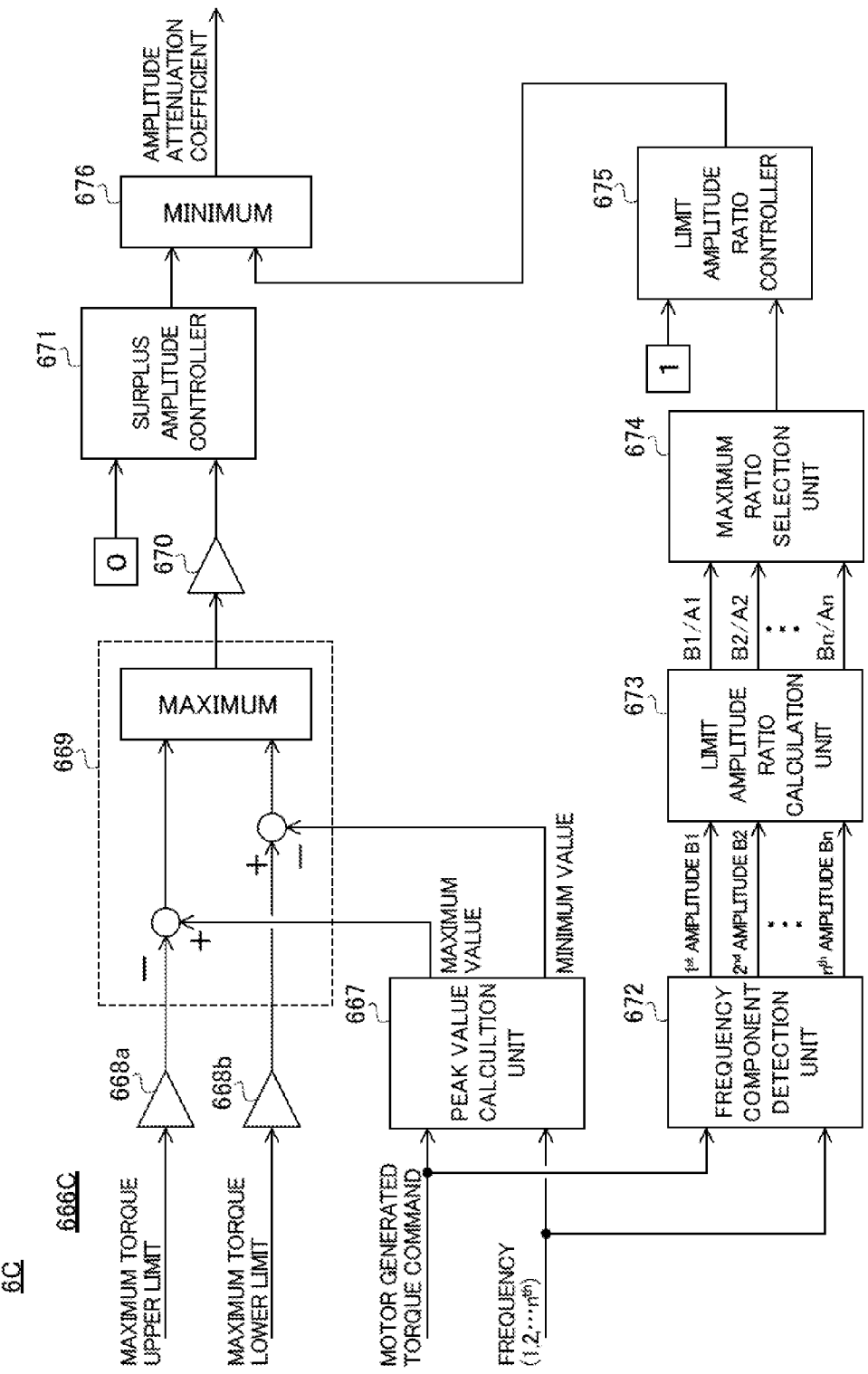
FIG. 10 is a block diagram showing the configuration of an attenuation coefficient calculation unit of Example 4.
Figure 11:
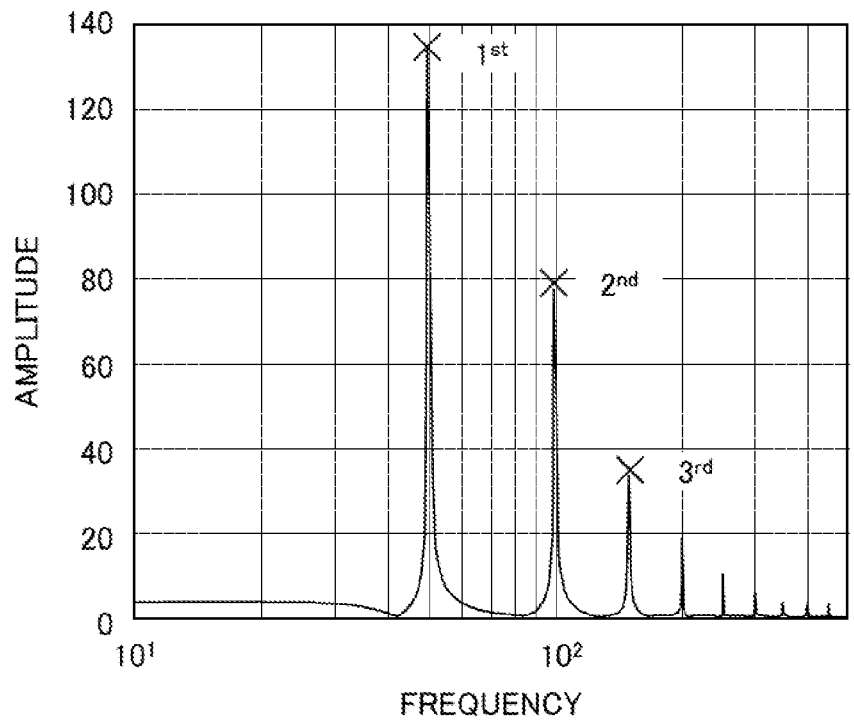
FIG. 11 is a graph showing frequency components of a torque command signal.

FIG. 10 is a block diagram showing the configuration of an attenuation coefficient calculation unit 666C of the present example. The torque command generation device 6C of Example 4 differs in the configuration of the attenuation coefficient calculation unit 666C from the torque command generation device 6B of Example 3. The attenuation coefficient calculation unit 666C of Example 4 differs from Example 3 in the aspect of including a limit amplitude controller 675 in addition to the surplus amplitude controller 671 of Example 3, and setting the smaller one among the two coefficients calculated by these two controllers 671, 675 as the amplitude attenuation coefficient. Hereinafter, the functions added over Example 3 will be explained by referencing FIG. 10.

A frequency component detection unit 672 detects the frequency component of the torque command signal based on information related to the frequency of the torque command signal sent from the combustion simulation waveform generation unit 61B (refer to FIG. 6). As shown in FIG. 7, the torque command signal is generated to overlap the AC signal of a plurality of frequencies on top of the DC component. The frequency component detection unit 672 detects the frequency components of the torque command signal, and calculates the amplitude for every order (B1, B2, . . . Bn).

Figure 12:
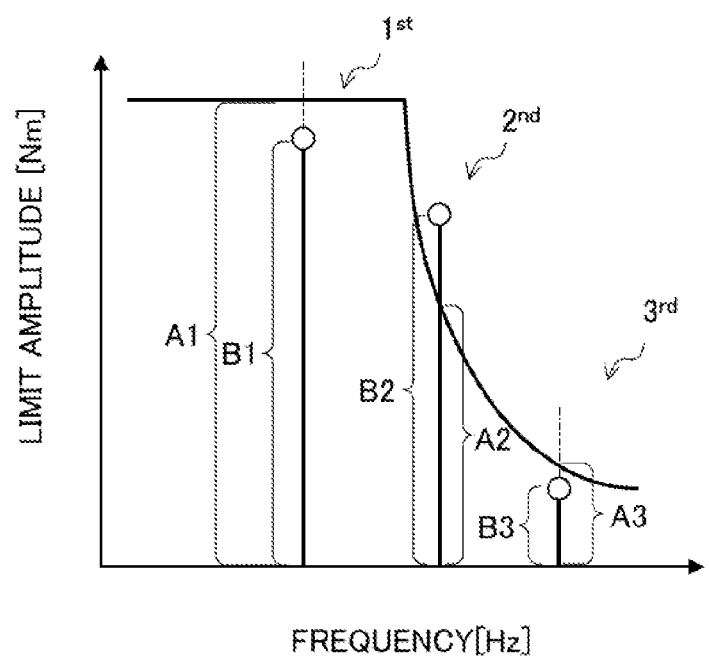
FIG. 12 is a graph showing limit amplitude ratios for every frequency order.
Figure 13:
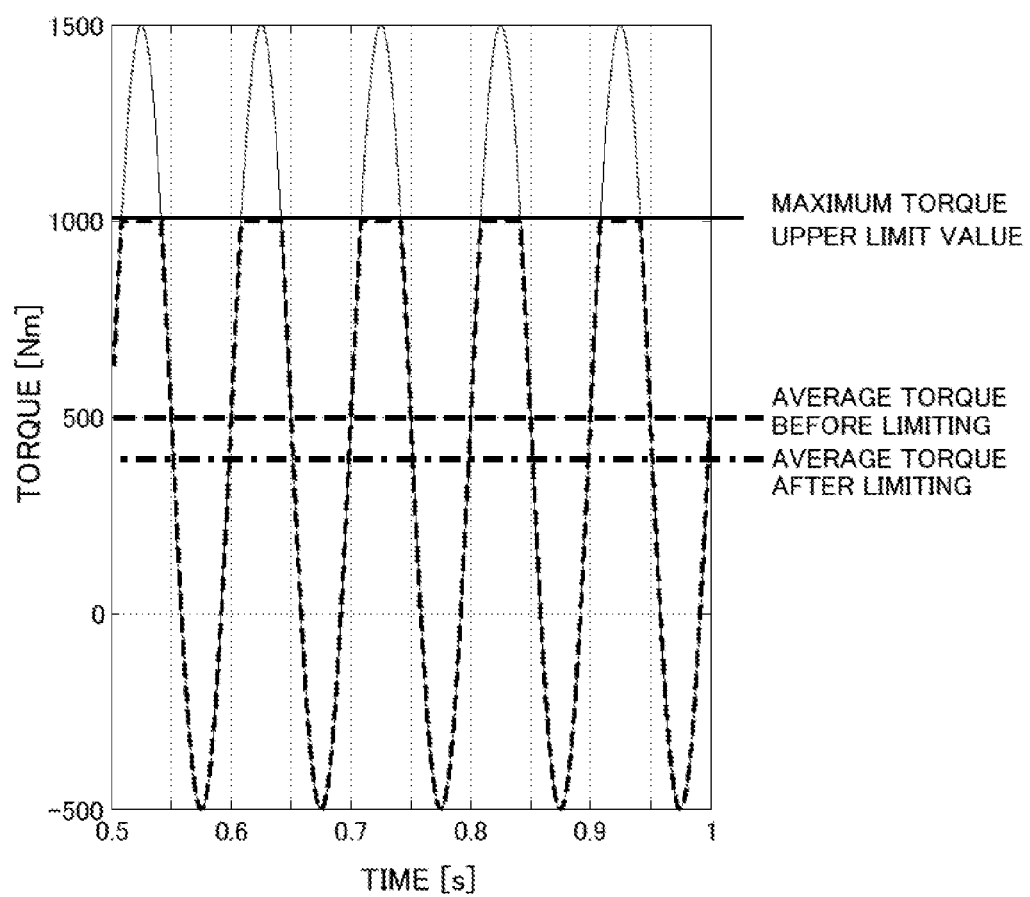
FIG. 13 is a graph showing a specific example of a motor-generated-torque command signal inputted from the torque command generation device to a motor driving device.

A limit amplitude ratio calculation unit 673 calculates the limit amplitude for every order (A1, A2, . . . An) based on a map such as that shown in FIG. 12. Since the same map as that for the limit amplitude calculation unit 634 explained by referencing FIG. 2 in Example 1 is used in the map determining this limit amplitude, a detailed explanation will be omitted. The limit amplitude ratio calculation unit 673 calculates the ratio of amplitudes (B1, B2, . . . Bn) calculated by the frequency component detection unit 672 relative to the calculated limit amplitudes (A1, A2, . . . An) for every order, and sets these as the limit amplitude ratios (B1/A1, B2/A2, . . . Bn/An).

A maximum ratio selection unit 674 selects the largest ratio from among the limit amplitude ratios (B1/A1, B2/A2, . . . Bn/An) calculated for every order. According to the example shown in FIG. 12, the limit amplitude ratio for the second frequency (B2/A2) is the largest. Therefore, in this case, all of the frequency components can be made smaller than the limit amplitude by determining an amplitude attenuation coefficient so that the amplitude of the second frequency component is no more than 1.

A limit amplitude controller 675 calculates the amplitude attenuation coefficient so that the largest limit amplitude ratio selected by the maximum ratio selection unit 674 becomes a predetermined target value (e.g., 1). In this limit amplitude controller 675, a controller with a built-in integrator that sets the steady-state deviation between the limit amplitude ratio and the target value to 0 is used, similarly to the surplus amplitude controller 671.

A minimum value selection unit 676 sets the smaller one among the coefficient calculated by the surplus amplitude controller 671 and the coefficient calculated by the limit amplitude controller 675, i.e. the one for which the amplitude of the AC signal is more strongly restricted, as the amplitude attenuation coefficient.

According to Example 4 explained above, the following effects are exerted in addition to the effects of (1) of Example 1 and (6) of Example 3.

(7) In Example 4, the frequency component of the motor-generated-torque command signal is detected by the frequency component detection unit 672, and the ratio (limit amplitude ratio) of amplitudes detected by the frequency component detection unit 672 relative to a limit amplitude is further calculated for every order of frequency. Then, the amplitude attenuation coefficient is determined so that the largest ratio among these limit amplitude ratios calculated for every order becomes 1. It is thereby possible to generate a motor-generated-torque command signal that is appropriately limited to within the operating range established from the motor revolution speed and within the operating range established from the frequency of the motor.

In Example 4 explained above, the frequency component detection unit 672 corresponds to the frequency component detection means, and the limit amplitude ratio calculation unit 673 corresponds to a limit amplitude calculation means and limit ratio calculation means, which correspond to a limit amplitude controller.

EXPLANATION OF REFERENCE NUMERALS

W test piece, 1 test system for drivetrain, 2 input-side dynamometer (motor), 6 torque command generation device, 633 maximum torque calculation unit (AC signal generation means, limit value calculation means), 634 limit amplitude calculation unit (AC signal generation means, limit value calculation means), 635 DC component limiter (DC signal generation means), 636 provisional value calculation unit (AC signal generation means, surplus amplitude calculation means), 637 surplus amplitude calculation unit (AC signal generation means, surplus amplitude calculation means), 638 AC component limiter (AC signal generation means, transmission means), 639 sine-wave transmitter (AC signal generation means, transmission means), 640 summing unit (compositing means), 6A torque command generation device, 63A torque restrictor, 653 base value calculation unit (base value calculation means), 654 correction calculation unit (correction means), 655 torque limiter (torque command generation means), 6B torque command generation device, 661 DC component calculation unit (DC signal generation means), 662 AC component calculation unit (AC signal generation means, base signal generation means), 663 multiplying unit (AC signal generation means, multiplying means), 664 summing unit (compositing means), 665 maximum torque calculation unit (limit value calculation means), 666 attenuation coefficient calculation unit (AC signal generation means), 671 surplus amplitude controller (surplus amplitude control means), 6C torque command generation device, 666C attenuation coefficient calculation unit (AC signal generation means), 672 frequency component detection unit (frequency component detection means), 673 limit amplitude ratio calculation unit (limit amplitude calculation means, limit ratio calculation means), 675 limit amplitude controller (limit amplitude limiting means).

The invention claimed is:

1. A torque command generation device that generates a motor-generated-torque command signal for driving a motor in a drivetrain test system for generating a torque imitating an engine of a vehicle with a motor connected to a shaft of a drivetrain of the vehicle, the device comprising:
   a limit value calculation unit for calculating a limit value for a value of the motor-generated-torque command signal according to a revolution speed of the motor;
   a DC signal generation unit for generating a DC signal;
   an AC signal generation unit for generating an AC signal; and
   a compositing unit for compositing the DC signal and the AC signal to generate the motor-generated-torque command signal,
   wherein the AC signal generation unit includes:
   a surplus amplitude calculation unit for calculating a surplus amplitude by subtracting the limit value from a sum of a value of the DC signal and a predetermined base amplitude; and
   a transmission unit for generating the AC signal of an amplitude obtained by subtracting the surplus amplitude from the base amplitude,
   wherein the AC signal generation unit generates the AC signal of an amplitude such that the value of the motor-generated-torque command signal does not exceed the limit value, by using the surplus amplitude calculation unit and the transmission unit.

2. The torque command generation device according to claim 1,
   wherein the AC signal generation unit further includes a limit amplitude calculation unit for calculating a limit amplitude according to a frequency of the AC signal, and
   wherein the transmission unit generates the AC signal of the smaller amplitude among the limit amplitude and an amplitude obtained by subtracting the surplus amplitude from the base amplitude.

3. A torque command generation device that generates a motor-generated-torque command signal for driving a motor in a drivetrain test system for generating a torque imitating an engine of a vehicle with a motor connected to a shaft of a drivetrain of the vehicle, the device comprising:
   a limit value calculation unit for calculating a limit value for a value of the motor-generated-torque command signal according to a revolution speed of the motor;
   a DC signal generation unit for generating a DC signal;
   an AC signal generation unit for generating an AC signal; and
   a compositing unit for compositing the DC signal and the AC signal to generate the motor-generated-torque command signal,
   wherein the AC signal generation unit includes:
   a base signal generation unit for generating a base AC signal;
   a multiplying unit for generating the AC signal by multiplying a predetermined amplitude attenuation coefficient by a value of the base AC signal; and
   a surplus amplitude limiting unit for determining the amplitude attenuation coefficient so that there is no deviation between a maximum value of the motor-generated-torque command signal and the limit value, wherein the AC signal generation unit generates the AC signal of an amplitude such that the value of the motor-generated-torque command signal does not exceed the limit value, by using the base signal generation unit, the multiplying unit, and the surplus amplitude limiting unit.

4. The torque command generation device according to claim 3, wherein the AC signal generation unit includes:
a frequency component detection unit for detecting a frequency component of the motor-generated-torque command signal;
a limit amplitude calculation unit for calculating a limit amplitude according to the frequency of the motor-generated-torque command signal;
a limit ratio calculation unit for calculating a ratio of amplitude detected by the frequency component detection unit relative to the limit amplitude calculated by the limit amplitude calculation unit for each of a plurality of different frequencies; and
a limit amplitude limiting unit for determining the amplitude attenuation coefficient so that the largest ratio among a plurality of ratios calculated by the limit ratio calculation unit becomes a predetermined target value.

* * * * *